United States Patent [19]

Theimer et al.

[11] 4,100,302

[45] * Jul. 11, 1978

[54] CONTAINER FOR ELECTRICAL RESISTANCE COOKING

[75] Inventors: Ernst Theodore Theimer, Rumson; George E. Heinze, East Brunswick, both of N.J.

[73] Assignee: Lectrofood Corp., East Brunswick, N.J.

[*] Notice: The portion of the term of this patent subsequent to Jun. 29, 1993, has been disclaimed.

[21] Appl. No.: 747,307

[22] Filed: Dec. 3, 1976

Related U.S. Application Data

[63] Continuation-in-part of Ser. No. 675,773, Apr. 12, 1976, Pat. No. 4,016,297, which is a continuation-in-part of Ser. No. 446,822, Feb. 28, 1974, Pat. No. 3,966,972.

[51] Int. Cl.² .................. B65B 25/22; A23L 3/32
[52] U.S. Cl. .................................. 426/90; 99/358; 426/92; 426/107; 426/234
[58] Field of Search ............... 426/107, 244, 245, 246, 426/234, 89, 90, 92, 302–304, 305, 129, 573, 575; 99/358; 219/383

[56] References Cited

U.S. PATENT DOCUMENTS

| | | | |
|---|---|---|---|
| 2,222,087 | 11/1940 | Parsons | 426/246 |
| 2,474,390 | 6/1949 | Aff | 426/107 |
| 2,896,527 | 7/1959 | Richman et al. | 99/358 X |
| 2,939,793 | 6/1960 | Richman | 426/245 X |
| 3,062,663 | 11/1962 | Furgal et al. | 426/107 X |
| 3,117,511 | 1/1964 | Everett | 99/358 X |
| 3,230,861 | 1/1966 | Korr | 99/358 |
| 3,245,338 | 4/1966 | Korr | 426/107 |
| 3,548,738 | 12/1970 | McDevitt | 99/358 |
| 3,873,742 | 3/1975 | Miyahara | 426/234 |
| 3,886,290 | 5/1975 | Theimer et al. | 426/107 |
| 3,966,972 | 6/1976 | Theimer et al. | 426/107 X |

OTHER PUBLICATIONS

Modern Packaging 4/57 pp. 94, 95.

*Primary Examiner*—Steven L. Weinstein
*Attorney, Agent, or Firm*—Richard S. Roberts; Arthur L. Liberman

[57] ABSTRACT

A container and composition of matter combination useful in connection with electrical resistance cooking of electrically high conducting foods which comprises:
  (a) An electrically and preferably thermally insulating container which defines a food cavity having a substantially uniform longitudinal cross sectional area, and an aperture in each of its two most diametrically opposite ends; and
  (b) Electrical contacts located at said diametrically opposite ends attached to a surface, preferably the inside surface of the container ends while draping the apertures and extending out of the container to a source of electrical energy, and
  (c) A composition in intimate contact with the inner surfaces of said electrical contacts and the subject foodstuff consisting essentially of:
    (i) a gel; and
    (ii) a substantially ionized species said composition being positioned to make intimate non-arcing contact between the electrically high conducting foodstuff and the electrical contacts during current flow.

When the container is in a closed position and the electrically conducting and non-conducting foods are properly positioned therein, the electrically conducting food is pressed tightly against the electrical conducting means located approximately at substantially diametrically opposite internal surfaces of the ends of the container in a form-fitting manner, due to plunging means urged through the apertures in the diametrically opposite ends of the container where the electrical conducting means are provided.

12 Claims, 16 Drawing Figures

CONTAINER FOR ELECTRICAL RESISTANCE COOKING

This application is a continuation-in-part of U.S. application for Letters patent Ser. No. 675,773, filed on Apr. 12, 1976 now U.S. Pat. No. 4,016,297 issued on Apr. 5, 1977, which in turn is a continuation in part of U.S. application for letters patent Ser. No. 446,822, filed Feb. 28, 1974, now U.S. Pat. No. 3,966,972 issued on June 29, 1976.

BACKGROUND OF THE INVENTION

Electrical resistance cooking is well known in the art and has the desirable benefit of a relatively short cooking time which consequently saves substantial energy since energy is not required to maintain food at temperatures convenient for consumption for long periods prior to eating.

The present invention relates to a novel container and composition of matter combination used in connection with the electrical resistance cooking of electrically high conducting foodstuffs.

The invention comprises:
(a) An electrically and preferably thermally insulating container which defines a food cavity having a substantially uniform longitudinal cross sectional area, and an aperture in each of its two most diametrically opposite ends; and
(b) Electrical contacts located at said diametrically opposite ends attached to a surface, preferably the inside surface of the container ends while draping the apertures and extending out of the container to a source of electrical energy, and
(c) A composition in intimate contact with the inner surfaces of said electrical contacts and the subject foodstuff consisting essentially of:
  (i) a gel; and
  (ii) a substantially ionized species said composition being positioned to make intimate non-arcing contact between the electrically high conducting foodstuff and the electrical contacts during current flow.

The present invention allows food retained within the container food cavity to be completely cooked without the necessity of handling the food or removing the food from the container.

Principally it provides a means and package for conveniently containing, cooking and serving an electrically high conducting food product which is particularly expedient for fast food dispensing.

The disadvantages of the prior art include the occurrence of electrical arcing and the consequent non-cooking and burning of the foodstuff caused by inaccurate placement of the food relative to the electrodes and particularly by inadequate electrical continuity.

The disadvantages of specific prior art citations will be further discussed in detail.

The present invention overcomes the above mentioned prior art difficulties by means of the container and gel with ionized species composition of this application by providing improved continuous electrical contact between the electrodes. Functionally, the larger area of electrical contact eliminates arcing, burning and non cooking of foodstuff by improving the flow of current. This invention is particularly applied to a unit food package such as a unit sausage (e.g. frankfurter), pizza, hamburger or cheeseburger package and more particularly to a unit moisture-containing compound food package in which an electrically conducting food such as a frankfurter, which is in intimate contact and within or upon a suitable non-electrically conductive food substance such as a bun, may be cooked without arcing occurring and caused to remain conveniently hot throughout and palatable for a convenient period of time after cooking.

DESCRIPTION OF THE PRIOR ART

The cooking of an electrically conducting food substance by passing an electrical current therethrough, i.e., by means of electrical resistance cooking, is known, as shown by the following U.S. patents:

U.S. Pat. No. 3,651,752,
Inventor: Roslonski
discloses: a packaged food product such as a frankfurter having a wrapper. The wrapper ends have two separate conducting strips which contact two portions of the food substance for cooking same. The wrapper is sealed about the ends of the food substance allegedly to insure good electrical contact between the conducting strips and the food substance.

U.S. Pat. No. 2,939,793.
Inventor: Richman
discloses: a frankfurter package unit including a frankfurter axially confined in a wrapper, the frankfurter having its pulp portion exposed at both ends at right angles to its longitudinal axis within the wrapper, the wrapper consisting of sealed end portions formed of flexible metallic electrical conducting material secured at opposite end portions to a central non-conducting wrapper material, the trimmed ends of the frankfurter being in juxtaposition to the sealed metallic conductor ends of the wrapper whereby the frankfurter can be cooked without removing the wrapper, by insertion of the entire package intermediate to a pair of electrodes and applying electrical current through the electrodes in sufficient amount to heat the frankfurter without the electrodes perforating the wrapper.

U.S. Pat. No. 3,548,738.
Inventor: McDevitt
discloses: a hot dog vending machine including a cold food storage compartment, a pair of vertically spaced actuating bars and a composite hot dog - electrode cooking package stored within the food compartment with special emphasis on the nature of the package, which package includes a pair of spaced electrodes each of which is bonded to the hot dog and retained within a cylindrical carboard container previously formed for operation in the machine and cooperating with the spaced actuating bars. The electrodes may be in the form of end caps which fit in intimate contact over the ends of the frankfurter and which do not puncture the frankfurter.

United States Pat. No. 3,886,290
Issue Date: May 27, 1975
Inventors: Ernst Theodore Theimer Donald Joseph Roslonski
discloses: a packaged food product comprising:
(a) An electrically low conducting food;
(b) An electrically high conducting food disposed in proximate contact with said low conducting food;

(c) Said high conducting food having two axially polar high conducting food portions having external surfaces and extending outwardly beyond said low conducting food;

(d) Enclosing said low conducting food, a hollow thermally insulating substantially moisture-impervious container for holding said electrically low conducting food, said container being capable of existing in a closed position and in an open position, said container comprising two sections having substantially conterminous edges, a first section and a second section articulating said first section, said first section and said second section having mutually substantial continuous co-extensive edges, at least of one said sections having an internal surface designed to fixedly hold said food over a substantial portion of the surfaces of said food when the container is in a closed position;

(e) At least one of said container sections having axially polar ends, said axially polar ends having internal axially polar surfaces which are co-extensive with the external surface of said axially polar high conducting food portions;

(f) Electrical conducting means extending outwardly from said container, said electrical conducting means having electrical conducting ends external to said container, said ends being designed to make electrical contact with the terminals of an electrical energy source when said container is in a closed position, said electrical conducting means being affixed to each of said internal axially polar surfaces, said electrical conducting means being in intimate electrical contact with the external surfaces of said two axially polar high conducting food portions when said container is in a closed position.

One of the principal advantages of this type of electrical resistance cooking is the relatively short period of time required for conducting food substances to be effectively cooked thereby. Accordingly, electrical resistance cooking has been taught to be employed preferentially in food dispensing machines where speed of cooking is particularly desirable.

One of the most common conducting food substances cooked by electrical resistance cooking in dispensing machines is the frankfurter. Prior to the above-named invention of Theimer and Roslonski, a frankfurter pierced at each end by an electrode was cooked by passing an electrical current between the electrodes. Usually, the frankfurter is disposed within a bun, and the resulting sandwich enclosed by a wrapping having suitable openings for admitting the electrodes therein. The principal disadvantage of employing a package of this type is that the food substances within the package are exposed to the surrounding atmosphere and thus subject to contamination.

One solution to this problem was to enclose associated conducting and non-conducting food substances, i.e. a frankfurter and bun, in a wrapper having conducting portions which contact the conducting food substance so that electrical current may be passed through such substance without disturbing the integrity of the wrapper. A packaged food product of this type is disclosed in Richman U.S. Pat. No. 2,939,793. However, new problems were posed by this packaging technique, namely the difficulty of maintaining good electrical contact between the conducting portions of the wrapper and the conducting food substance so that unacceptable arcing and resultant burning which occurred during the cooking operation. One solution to this problem, offered in the aforementioned Richman patent, was to lay bare as by peeling the ends of the conducting food substance to expose the inner portions thereof. Such exposed inner portions are then placed in intimate contact with the conducting portions of the wrapper.

However, this solution is essentially inoperable using the method described in Richman, and further, using the technique described in Roslonski, or that shown in FIG. 9 of McDevitt since the contact area (in each of the disclosures) between electrode and frankfurter is too small to permit rapid cooking without charring of the meat. In addition, baring the ends of the frankfurter as done by Richman, is a costly, unhygienic and superfluous operation. Further, encasing each end of both the conducting food and non-conducting food (which encloses the conducting food), as described in Roslonski, leads to inefficiency and inconvenience to the consumer of the product. A further disadvantage when using the Roslonski product is that some of the foil may adhere to the food product when the package is opened for eating. The electrode caps of McDevitt (FIG. 9) must be removed prior to removal of the food product from the McDevitt vending machine. This aspect of McDevitt leads to much inconvenience on the part of both the vendor and the vendee of the McDevitt food unit.

Another solution offered by the Theimer and Roslonski invention partly solved the foregoing problems but did not completely obviate the problem of arcing and resultant burning during the electrical resistance cooking operation.

U.S. Pat. No. 3,062,663
Inventor: Furgal, et al
discloses: a food package which may readily be connected to a conventional electrical outlet for the heating of food (e.g. frankfurter) contained therein, whereby the food package comprises a container formed by an electrically non-conductive material, a pair of low resistance strip electrodes in longitudinally-spaced apart relation within said container, said electrodes having portions therein projecting through a wall of said container to provide prongs for insertion into an electrical outlet, and an electrically conductive solid food product disposed within said container between and in surface contact with bottom of said electrodes, said food product having an electrical resistance obtained greater than the resistance of said electrodes. In an embodiment which is irrelevant to our invention, Furgal, et al discloses electrodes which include resilient and electrically conductive moisture retaining pads in surface contact with opposite ends of the food produced. At column 2, lines 43–54, in describing these moisture retaining pads, Furgal, et al states:

" . . . these pads are formed from a porous cellulose sponge material saturated with an electrolytic solution such as brine which renders the pads electrically conducting. Gelatin, alginate and other sponge-like substances may also be used to form the moisture-retaining pads. By reason of their resilient character, the electroyltic pads are capable of accommodating size differences and size changes in solid food products while at the same time insuring proper electrical contact therewith at all times during a food heating operation".

Examples set forth infra disclose the advantages of our invention over Furgal, et al. The fact that the gelionized species composition is an integral part of the surface of the food article in our invention rather than being a moisture retaining sponge pad, gives rise to an advantage which is unobvious and unexpected, that advantage being the crux of our invention.

Thixotropic emulsions containing non-ionic suspension agents and ionized species suspended therewith are known in the prior art but no compositions as defined herein are known. Thus, Canadian Patent No. 734,862, issued on May 24, 1966 (Title: ELECTRICALLY CONDUCTIVE SYSTEMS) discloses a method for making an electrically conductive system for use in making electrocardiograms by providing an aqueous solution of a non-ionic blend of ethylene oxide derivatives of lanolin, said derivatives being higher fatty alcohols; controlling the electrical conductivity therein by adding a highly ionizable salt; and adding a buffer solution to provide a pH of between substantially 4 to 8. Examples of highly ionizable salts are sodium chloride, potassium chloride and sodium sulfate which comprises from about 1 up to about 10% of the system. These blends are not edible.

Other types of food containers whose primary purpose is for use in conjunction with electrical resistance cooking are also known to the art. These are represented by U.S. Pat. No. 3,230,861 dated January 25, 1966; U.S. Pat. No. 3,245,338 dated Apr. 12, 1966; and U.S. Pat. No. 3,311,285 dated Mar. 28, 1967 all issued to A.L. Korr.

A disadvantage of these embodiments is revealed when the inadequate contact area between the electrodes and the subject foodstuff causes unacceptable arcing, undesirable burning, bad taste, incomplete cooking and hence, renders the device effectively inoperative. Also, food has a tendency to adhere to the electrodes after the passage of current, creating an undesirable condition.

The present invention has the distinct advantage over these disclosures in that the gel and ionized species composition which is the important difference in our invention forms an electrical continuum adequate for complete cooking; foods do not stick to the electrodes after cooking, and that part of each electrode in contact with the food is discarded after use, hence sanitary conditions are maintained.

U.S. Pat. No. 2,306,573 dated Dec. 29, 1942
Inventor: Stern
discloses:
An electric cooking apparatus for frankfurters which comprises a base, a plurality of cups, absorbent pads disposed within each cup moistened with an electrolytic solution, and electrical terminals located in the bottom of each cup. In operation, a frankfurter is set so that each of its two end portions are positioned within distinct cups and bathed by said electrolytic solution when sufficient current is introduced to the provided terminals, the frankfurter is subsequently cooked.

U.S. Pat. No. 3,565,642 dated Feb. 23, 1971
Inventor: Hirsch
discloses:
A cooking appliance for food whereby the food is placed in a container between two electrolyte baths which are connected to a source of electrical potential by a pair of electrodes, preferably via a first and second resilient contact which is inserted into holes provided in the bottom of the container. The appliance is also preferable provided with a safety device for locking the lid during cooking, and the container is preferably removably mounted in a support base which contains the current supply conductors.

Both the developments of Hirsch and Stern require immersion of the subject foodstuff in electrolytic baths prior to introduction of electric current. These innovations require the unhygienic handling of foods prior to eating and furthermore are not readily adaptable for use in food vending machines. Other U.S. patents such as U.S. Pat. No. 2,959,339 dated Nov. 8, 1960
Inventor: Sierk
Discloses: A food package for use with a vending machine of U.S. Pat. No. 2,794,384.

This disclosure is radically different from the present invention since it requires food to be exposed to the outside environment, necessitates the impaling of food to effect cooking, provides for the severing of burned portions of meat, and does not utilize disposable electrodes internal to the package.

The following U.S. patents present appliances and methods for electrical resistance cooking, however, they require the undesirable impaling of the subject foodstuff to effect electrical continuity:

Simpkins; U.S. Pat. No. 2,390,277
Ford; U.S. Pat. No. 2,256,976
Steuber; U.S. Pat. No. 2,951,433
Everett; U.S. Pat. No. 3,117,511
Ford; U.S. Pat. No. 2,274,325
Watson; U.S. Pat. No. 2,200,405
McConnell, et al.; U.S. Pat. No. 2,139,690
Aff; U.S. Pat. No. 2,474,390
Spiess; U.S. Pat. No. 2,642,794

The following U.S. Patents also present appliances and methods for electrical resistance cooking, however, these require the ends of the subject foodstuff to be immersed in electrolytic baths to provide electrical continuity:

Sharpe; U.S. Pat. No. 2,405,984
Berkeley; U.S. Pat. No. 2,025,085

Richman, in U.S. Pat. No. 2,930,312 describes a vending machine mechanism whereby cooking is effected by use of a food heater.

Sierk, in U.S. Pat. No. 2,794,384 describes a vending machine incorporating electrical resistance cooking, however, this invention requires the severing of burned portions of meat.

Lee, et al, in U.S. Pat. No. 3,167,431 describes an appliance used for cooking ground meats and is not useful with prepackaged food products such as frankfurters.

SUMMARY OF THE INVENTION

This invention presents substantial improvements over the aforementioned prior art and comprises:

(a) An electrically and preferably thermally insulating container which defines a food cavity having a substantially uniform longitudinal cross sectional area, and an aperture in each of its two most diametrically opposite ends; and (b) Electrical contacts located at said diametrically opposite ends attached to the surface, preferably the inside surface of said container ends while draping the apertures and extending out of the container to a source of electrical energy; and (c) A composition in intimate contact with the inner surfaces of said electrical contacts and the subject foodstuff consisting essentially of:
  (i) a gel; and
  (ii) a substantially ionized species The composition useful for the purpose of our invention which is to be in intimate contact with both the surface of the food substance and at the same time with the electrical contacts, consists essentially of:
  (i) An aqueous gel selected from the group consisting of agar, xanthan gum, tragacanth, guar gum, gum arabic and algin gum, in water; and
  (ii) A substantially ionized species selected from the group consisting of sodium chloride, potassium chloride, ammonium chloride, magnesium chloride, sodium glutamate, potassium glutamate, sodium alginate, potassium alginate, ammonium alginate, magnesium alginate, calcium alginate, sodium bicarbonate, potassium bicarbonate, magnesium bicarbonate, calcium bicarbonate.

The electrically high conducting foodstuff of our invention preferably has an electrical resistivity in the range of from 1 up to 50 ohm inches over a temperature range of from 30° up to 250° F. Electrically high conducting foodstuffs having such physical properties are exemplified by the following:
1. Ground meat patties
2. Sausage
3. Pizza topping
4. Kielbasa
5. Blintzes
6. Egg rolls
7. Cold Cuts
8. Cold cuts-cheese combination, and
9. Cold cut-chopped liver combination The electrically high conducting food substance of our invention preferably has coated thereon a composition wherein the weight ratio of gel to substantially ionized species is from about 1:20 up to about 20:1. The composition comprising the gel and the ionized species is an integral part of discrete portions of the electrically high conducting food substance in the proximate regions where the electrical conducting means contact the electrically high conducting food substance.

More specifically, the edible electrically high conducting composition useful in our invention is intended to form a continuous phase. The composition of the coating initially comprises:
  (i) From 86 up to 99.33 weight percent water;
  (ii) From 0.5% up to 4.0% by weight of the said edible gel; and
  (iii) From 0.2% up to 10.0% by weight of the edible ionized species.

Typically the invention of this disclosure is used to define a package food product which comprises:
  (a) An electrically and preferably thermally insulating container which defines a food cavity having a substantially uniform longitudinal cross sectional area, and an aperture in each of its two most diametrically opposite ends; and
  (b) Electrical contacts located at said diametrically opposite ends attached to the surface, preferably the inside surface of said container ends while draping the apertures and extending out of the container to a source of electrical energy; and
  (c) A composition in intimate contact with the inner surfaces of said electrical contacts and the subject foodstuff consisting essentially of:
    (i) a gel; and
    (ii) a substantially ionized species
  (d) an electrically low conducting food having high electrical resistivity;
  (e) an electrically high conducting food disposed in proximate contact with said low conducting food;
  (f) said high conducting food having at least two substantially diametrically opposite high conducting food portions, having substantially solid external surfaces.

An example illustrative of the principle of this invention now follows. A frankfurter and bun combination is set within an electrically and thermally insulating container as described above. Electrodes attached to the inside surface of the most diametrically opposite ends of the container contact the ends of the electrically high conducting food through the medium of the gel and ionized species composition. Plunging means are then employed to urge said electrodes in extremely intimate contact with the electrically high conducting food providing a form fit through the container end apertures. Electrical energy is subsequently imparted to the electrodes, thus cooking the food.

A container, as described above for the purposes of our invention is fabricated from an electrically and preferably thermally insulating material such as cardboard, or alternatively a rigid polymer, such as polyvinyl chloride or polyvinyl acetate polyvinyl chloride copolymer, or an aerated polymer such as polystrene or polyurethane in order to provide a light, disposable package suitable for use in vending machines and for large scale food vending operations where it is desirable to cook rapidly large quantities of units and keep them reasonably warm for relatively long periods of time subsequent to cooking. Examples of such vending machines are set forth in U.S. Pat. No. 3,651,752 issued on Mar. 28, 1972. In particular, such a container, shell or enclosure would be operable whereby when an electrical current in the initial range of 1.0 to 10.0 amperes and from 100 up to 500 volts is applied for a period of time from 3 up to 20 seconds to an electrical conducting means, the food product within the container (e.g. a frankfurter of $\frac{3}{8}$ to $\frac{7}{8}$ inch in diameter and 4.5 to 6 inches long) being cooked internally so that the average temperature of the electrically conducting food (such as a frankfurter) after cooking, is initially in the range from 140° to 212° F and the average temperature range of the accompanying low conducting food (e.g. a frankfurter roll, hamburger bun or pizza dough) is, after cooking, initially in the range of 100° to 160° F; and after about 50 minutes subsequent to cooking the average temperature of the high conducting food is in the range of from 100° to 150° F and the average temperature of the low conducting food is from 90° to 130° F. The container described herein accomplishes this, and in addition, obviates the need to expose fresh portions of the electrically conducting food (as, for example, by cutting or peeling the ends of frankfurter) thereby (1) maintaining proper hygienic standards; (2) simplifying the packaging and (3) improving the accessibility of the food to the consumer.

A typical cardboard container for use with this invention may be erected by appropriately folding and interlocking the sides of a blank such as that illustrated in FIG. 6.

The sides of said blank have substantially coterminous edges which articulate one another in such a manner as to form the required container and food cavity. The completed container is capable of existing in a closed position and an open position. Aluminum foil electrodes or other metalized surfaces are then suitably attached so as to drape the apertures at the diametrically opposite ends of the container.

The electrical contacts extend outwardly from said container, said electrical contacts having electrically conducting ends external to said container, said ends being designed to make electrical contact with an electrical energy source when said container is in a closed position.

Metallizing as mentioned above can be effected according to any of the processes set forth in U.S. Pat. Nos. 3,533,828, 3,549,505; or 3,669,714.

The above described package, when used in conjunction with the composition of our invention coated onto the electrical contacts or the high conducting food substance, or both, obviate the problem of undesirable arcing and consequent spot burning of the food, thereby making the food taste acceptable and also increasing the length of time of heat storage in the food substance.

The diametrically opposite internal ends of the container may be lined with electrically conducting means, preferably with an electrically conducting film such as a metalized aluminum surface or foil at least 0.1 to 0.6 mils in thickness (0.1 to 0.6 × $10^{-4}$ inches) with a preferred range of 0.2 to 0.4 mils.

The electrical conducting means may be pinned or adhered to the internal end regions of the container or may merely be enveloped by the container at the end regions thereof after the container is closed.

The ratio of the contacted surface area of the high conducting food portion to non-contacted area is preferably from about 1:100 up to 1:10. The term "contacted" is intended to mean "area of electrically high conducting food contacted by the electrical conducting means."

Too small a contact area leads to arcing at voltages and amperages commensurate with convenient, rapid cooking. High areas of contact are less practical although they are not harmful. The gel and ionized species composition of this invention is intended to assure intimate continuous current flow over a relatively small area. This is equivalent to a less firm contact over a relatively larger area.

Thus the ratio of coated surface area of high conducting food portion (that is, coated with composition consisting essentially of gel and ionized species) to non coated area is also preferably from about 1:100 up to 1:10. In addition the gel coating covers the entire area of contact between electrodes and food.

While a major use of the special package is for cooking frankfurters, other foods may be cooked with equal effectiveness in other packages using the same principles. These include: hamburgers, cheeseburgers, sausages other than frankfurters, pizza, kielbasa, blintzes, knishes, kishka, "egg rolls", cold cuts (e.g. corned beef, pastrami and roast beef), cold cut-cheese combinations, and cold cut-chopped liver combinations.

The container of this application is preferably from 4 to 12 inches in length, 1 to 4 inches in height and 1 to 4 inches in depth although larger or smaller sizes do not depart from the scope of this invention. Heating of the non-conducting food is dependent upon heat conduction into it by means of the mass transfer of hot water vapor diffusing from the conducting food into the non-conducting food as and after the conducting food is heated and/or by heat transfer per se. The operable and workable thickness range of the walls of the container used in conjunction with our invention is from 0.01 inches up to 1 inch with 3/32 to ¼ inches preferred in the case of a foamed polymer such as styrofoam and from 0.005 up to 0.1 inches preferred in the case of cardboard or a rigid polymer such as polyvinyl acetate-polyvinyl chloride copolymer, for ease in handling and for optimal thermal performance. The thermal conductivity of the materials of construction of the container should be less than 1.50 BTU/hour-sq.ft.-(°F/inch). A practical thermal conductivity range when using a foamed polymer is from 0.15 up to 0.50 BTU/hour-sq.ft.-(°F/inch).

The more preferred range of thermal conductivity of the foamed polymer-type materials of construction of the container of our invention is from 0.20 – 0.30 BTU/hour-sq. ft.-(°F.inch) at a mean temperature of between 60° and 100° F. Thus, for example, a convenient and workable polystyrene foam for use as a material of construction may have at a mean temperature of 75° F. the following thermal conductivity coefficients:

| Density | | K(BTU/hour-ft$^2$-(° F/inch) |
|---|---|---|
| 1 | lb/ft$^3$ | 0.26 |
| 1.5 | lb/ft$^3$ | 0.25 |
| 2 | lb/ft$^3$ | 0.24 |

A practical thermal conductivity range when using a thin wall (0.01–0.1 inch thickness) rigid polymer such as a polyvinyl chloride-polyvinyl acetate copolymer is from 1.0 up to 1.4 BTU/hour-sq.ft.-(°F/inch).

With the foregoing in mind, it is a primary object of the present invention to provide an improved food cooking container and food substance useable in conjunction with an improved packaged food product for use in hot food dispensing machines, an integral part of which is a specially designed article of manufacture, whereby during and subsequent to electrical resistance cooking the packaged food may be conveniently maintained in a heated state until its consumption.

Is a further object of this invention to provide an improved food cooking container and food substance useable in conjunction with cooking an electrically high conducting food substance which is caused to remain in a heated state until consumption by means of electrical resistance cooking.

It is a further object of the invention to provide an improved food cooking container useable in conjunction with an electrically high conducting food substance which food substance is caused to remain in a heated state after cooking until consumption.

It is another object of this invention to provide an improved container and composition of matter combination useful for the application of electrical resistance cooking which simplifies packaging, provides uniform cooking of the food without burning and retains the food in a conveniently heated state until consumption.

It is a further object of this invention to provide an improved container and composition of matter combination useful for the application of electrical resistance cooking which does not require handling of the food in order to achieve cooking and does not expose food to outside contamination hence maintaining hygienic standards.

It is also an object of this invention to provide an improved container and composition of matter combination useful for the application of electrical resistance cooking which improves the accessability of cooked food to the consumer, reduces food waste and provides a relatively short cooking time for convenient commercial applications, especially in food vending machines.

It is a further object of this invention to provide an electrically high conducting food substance which is adaptable for use in a container designed for enveloping an electrically low conducting food which is in contact with electrically high conducting food coated at its end regions with a composition comprising a gel and an ionized species which container is so designed that it is preferably both thermally and electrically insulating and the container includes, as integral parts thereof, at least two separate electrical conducting means substantially at the ends thereof passing from the outside of the container, each of which means is caused by the container itself to be in intimate non-arcing contact with the substantially diametrically opposite ends of the electrically conducting food (at the portions coated with the above-mentioned composition) intended to be cooked during the electrical resistance cooking operation.

It is a further object of our invention to provide an electrically high conducting food substance adaptable to be used in conjunction with a packaged food product (including the electrically conducting food substance in contact with an electrically non-conducting food substance) which food substance is enveloped in a container specifically designed for maximum convenience in catering by (i) facilitating the passage without undesirable electrical arcing of an electrical current through the electrically conducting food substance for electrical resistance cooking of same, and (ii) simultaneously causing same to remain in a heated state for an extended period of time subsequent to the passage of said electrical current without exposing the said food substance to possible sources of contamination.

These and other objects of the invention will become apparent upon a consideration of the detailed description of preferred embodiments thereof given in connection with the following drawings.

DETAILED DESCRIPTION OF THE PREFERRED EMBODIMENT

Figure 1:
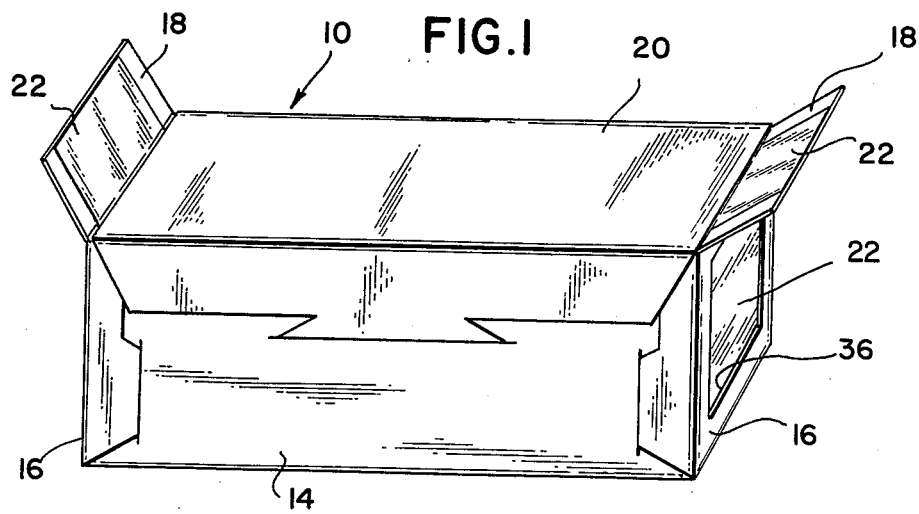
FIG. 1 is a front perspective view of the container of this application showing its erected appearance in a closed position. At its most diametrically opposed ends are apertures which are draped by electrical contacts, in this case current carrying foils which are attached to the inside surface of said most diametrically opposite ends. The contacts then extend out of the container via supporting attachment to the provided end flaps as shown.
Figure 2:
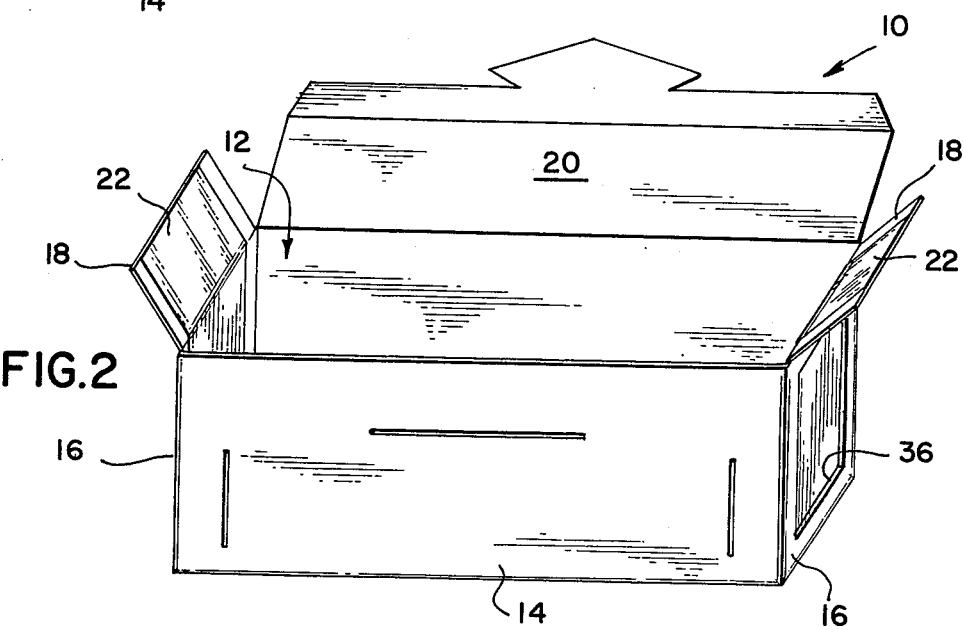
FIG. 2 is a front perspective view of the container of this application showing its appearance in an open position.
Figure 3:
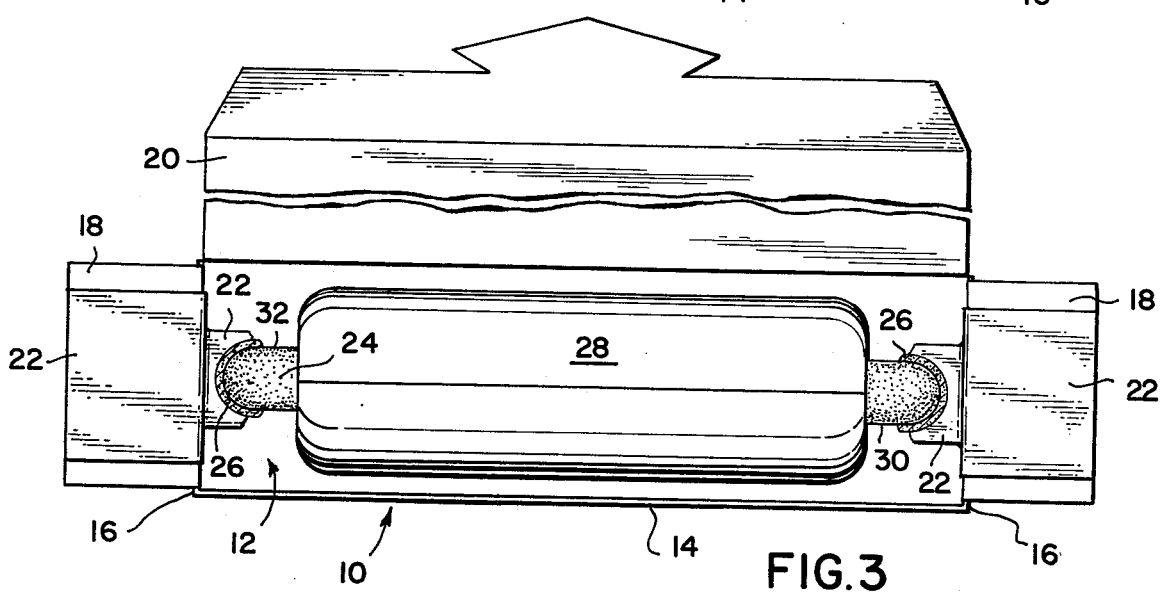
FIG. 3 is a plan view of our invention showing its operation with a subject food, here a frankfurter and bun. The electrical contacts are shown form fit to the ends of the electrically high conducting food with the gel and ionized species positioned therebetween. The form fit is accomplished by use of plunging means, not a part of this invention, being inserted through the container apertures and urging the flexible electrical conducting foils into extremely close contact with the electrically high conducting food. It will be understood that at this stage of the process the container will be in closed position in actual use.

Referring now to the drawings we show in FIGS. 1 through 3 the container of our invention to comprise an electrically and preferably thermally insulating enclosure 10 defining a food cavity 12 which is closed on all sides and has a substantially uniform longitudinal cross sectional area. The container comprises as shown in FIGS. 1 through 3 a plurality of sides 14, at least two end panels 16 with outwardly extending flaps 18, apertures 36, and may contain a closing lid 20.

Figure 4:
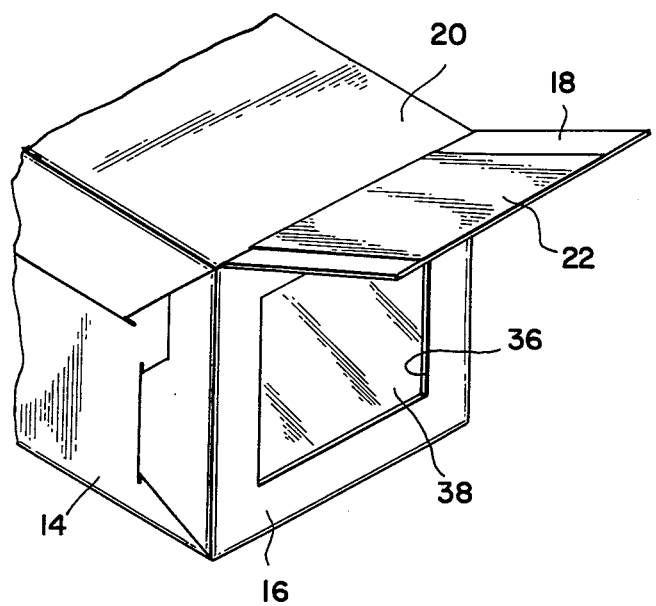
FIG. 4 is a close-up perspective view of one end of the container showing an optional flexible film draping the container aperture between the inside container end surface and the electrical contact. Such film may be utilized to provide added strength and integrity to this portion of the container and increase cleanliness. The end panel is capable to be form fit to the contained foodstuff.
Figure 5:
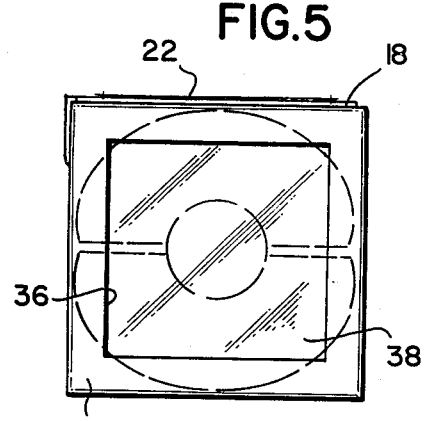
FIG. 5 is an end view of the container showing the aperture draping form fit to the subject foodstuff.
Figure 5A:
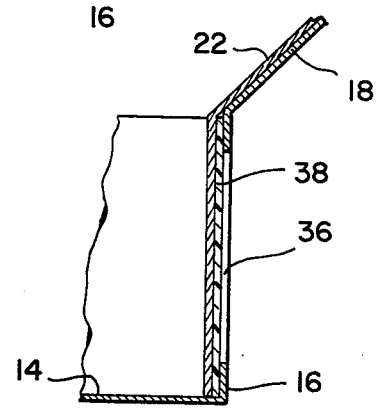
FIG. 5A is a cross sectional view of one of the container end panels showing the layers of flexible film and metal foil.

It may be fabricated from, for example, cardboard or styrofoam having a thickness of from 3/32 inch up to 1 inches and a thermal conductivity range over a mean temperature of from 60° up to 100° F of from 0.2 up to 0.3 BTU/hour-sq.ft. (°F/inch). The container is capable of existing in a closed position as shown in FIG. 1 and in an open position as shown in FIGS. 2 and 3. The outer surfaces of the container are so designed as to render said container conveniently adaptable for use in conjunction with an electrical resistance cooking apparatus such as is described in application for U.S. letters patent Ser. No. 747,309 filed on even date herewith. Suitably attached to the surface, preferably the inside surface of said end panels 16 and outwardly extending flaps 18 are electrical contacts 22 as shown in FIGS. 1 through 3 which consist of a metal foil or metallized surface capable of carrying an electrical current. As a particular embodiment of the invention a thin plastic film such as polyethylene, polypropylene, polyvinyl chloride, or cellulose acetate, may be positioned between the electrical contacts and the container end panels, draping the apertures, in order to provide additional strength, integrity and cleanliness to the package. This film is indicated at 38 of FIGS. 4, 5 and 5A. Coated on the inside surface of said electrical contacts 22 as shown in FIG. 3 or the end portions 30 and 32 of a subject electrically high conducting foodstuff 24 or both is the composition of matter 26 essential to this invention.

The utilization of the composition used in practising our invention which consists essentially of an ionized species such as sodium chloride, potassium chloride, ammonium chloride, magnesium chloride, sodium glutamate, potassium glutamate, sodium alginate, potassium alginate, magnesium alginate, calcium alginate, sodium bicarbonate, potassium bicarbonate, magnesium bicarbonate, calcium bicarbonate, and a gel such as agar, xanthan gum, tragacanth, guar gum, gum arabic and algin gum as well as water wherein:

(i) The weight percent of water is initially 86 to 99.3
(ii) The weight percent of gel is initially 0.5 to 4.0
(iii) The weight percent of edible ionized species is initially from 0.2 to 10.0 is illustrated at location 26 in FIG. 3. The composition may be coated onto an electrically high conducting food substance where the electrical contacts 22 are to meet the electrically high conducting food substance 24 as shown in FIG. 3. Alternatively, the composition useful for practicing our invention may be coated both onto the electrical contact 22 and onto the electrically high conducting food substance 24 where the electrical contact 22 will be in intimate non-arcing contact with the electrically high conducting food substance 24 during cooking.

The container 10 and gel with ionized species 26 which is presently disclosed is useful in forming a food package illustrated in FIG. 3 as comprising an electrically low conducting food substance such as a frankfurter bun 28; and an electrically high conducting food substance such as a frankfurter 24 disposed in proximate contact as shown in FIG. 3 with the low conducting food substance, said electrically high conducting food having an electrical resistivity of from 1 up to 50 ohm inches over a temperature range of from 30° up to 250° F and having substantially diametrically opposite ends, with substantially solid surfaces.

At least two electrical contacts 22 as shown in FIG. 3 are located at the substantially diametrically opposite ends 30 and 32 of the electrically high conducting food substance 24 in intimate non-arcing contact with the electrically high conducting food substance 24 during cooking such that an electrical current can easily pass from the contact 22 to the electrically high conducting food substance 24 without undergoing a high voltage drop. The composition as stated above, comprising an edible gel and an edible ionized species is positioned, e.g., at 26 in the case of the frankfurter of FIG. 3 to make intimate non-arcing contact between the electrically high conducting food substance 24 and the two electrical contacts 22.

Figure 6:
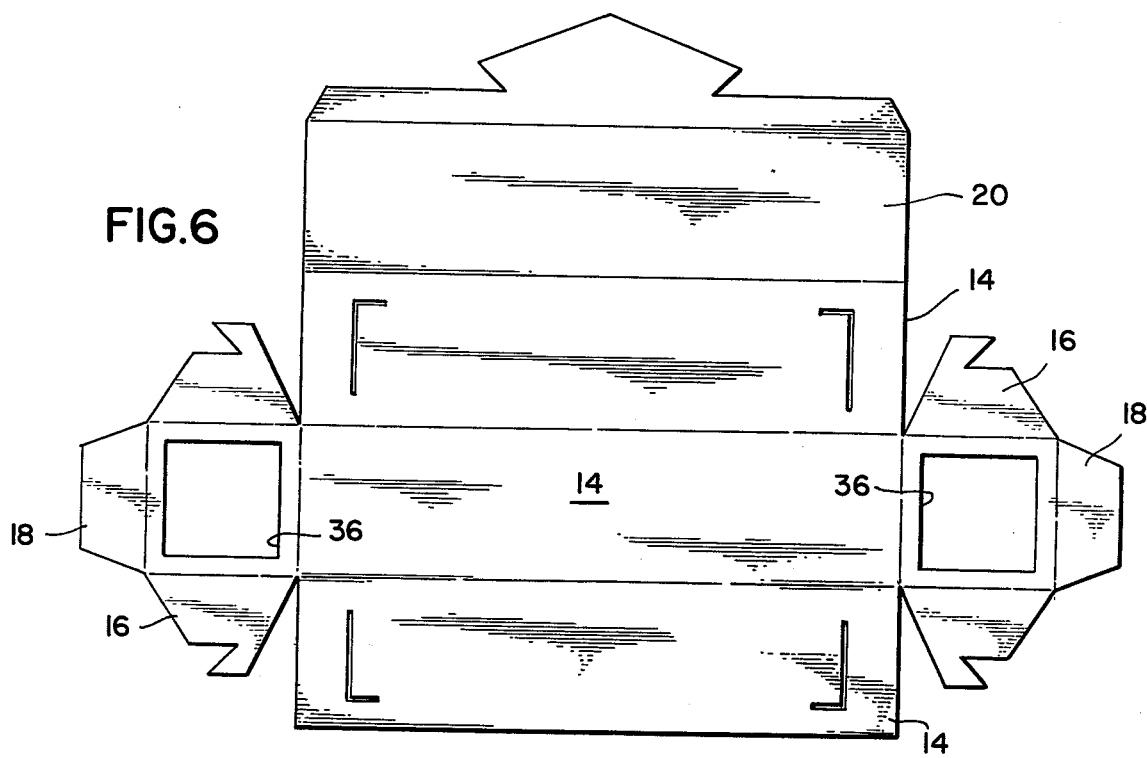
FIG. 6 is a blank which when assembled forms the container of this invention, shown here prior to (i) application of the electrical contacts and (ii) optional flexible film.
Figure 7:
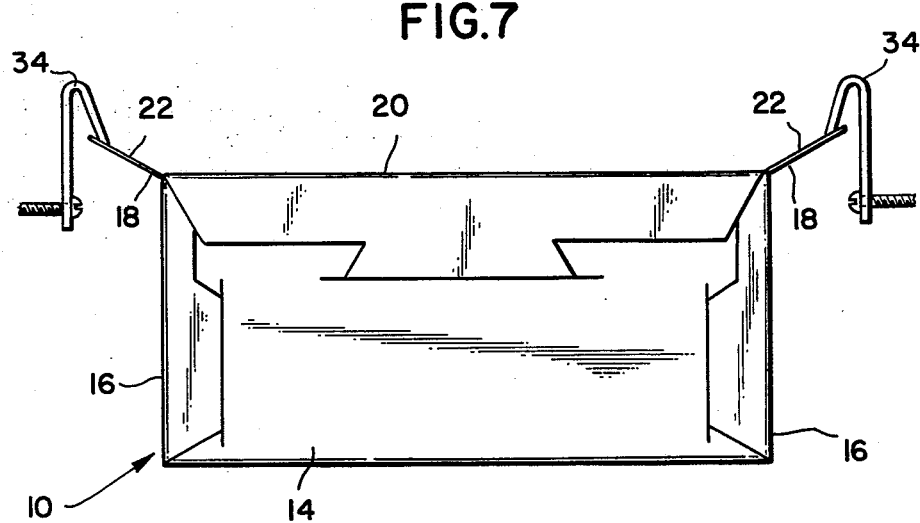
FIG. 7 is a front elevational view of the container of this invention shown attached to a source of electrical energy.

The container is constructed of a plurality of sections 14, 16 and 20 having substantially co-terminous or interlocking edges articulating one another as shown in FIG. 6. Electrical conducting means such as strips of aluminum foil 22 having a thickness of approximately 0.2 mils extend outwardly from the container 10 upon flaps 18 as shown in FIG. 3. The electrical conducting means are designed to make electrical contact with the terminals 34 of the electrical energy source when the container is in closed position as shown in FIG. 7.

In common, intimate, non-arcing contact with at least two discrete (or discontinuous) portions (having a substantial degree of separation therebetween) of at least one of the external surfaces of the electrically high conducting food are:

1. An electrically high conducting composition consisting essentially of a gel and an edible ionized species 26 as illustrated in FIG. 3.
2. At least two electrical contacts shown as 22 in FIGS. 1 through 3, the composition being positioned to make intimate non-arcing contact between the two electrical contacts 22 and the substantially solid surface of the electrically high conducting food substance 24.

The preferred ratio of the surface area of the contacted electrically high conducting food substance (that is, contacted with an electrical contact) to the surface area of non-contacted high conducting food substance is from 1:100 up to 1:10 with the most preferred ratio being from 1:50 up to 1:25. The gel-ionized species composition is applied in an amount to at least fill completely the entire area of electrical contact when the container is in operative position. The electrically high conducting food may also be thermally high conducting.

The following example serves to illustrate the operation of the presently disclosed invention.

An electrically and preferably thermally insulating container 10 is formed by appropriately folding and interlocking a blank as shown in FIG. 6. A thin plastic film 38 is then positioned between the electrical contacts 22 and the inside container end panels 16 draping the apertures 36 and providing added strength, integrity and cleanliness to the package.

Figure 12:
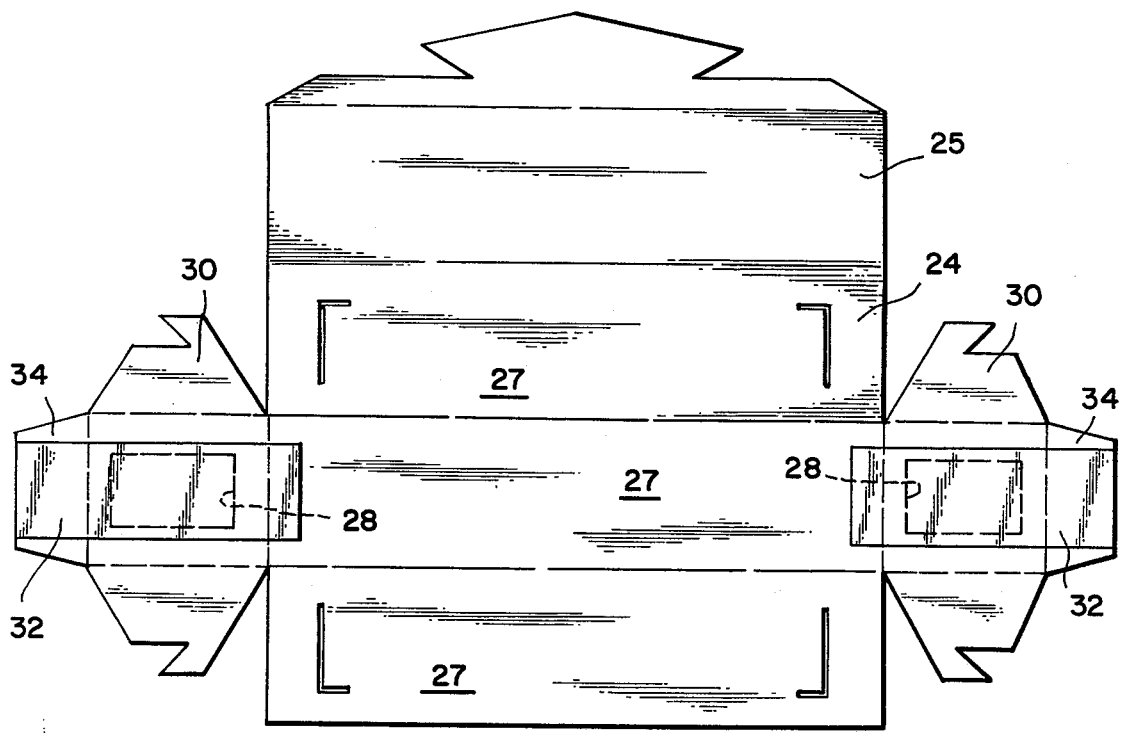
FIG. 12 is a blank similar to FIG. 6 additionally showing attached foil electrodes.
Figure 13:
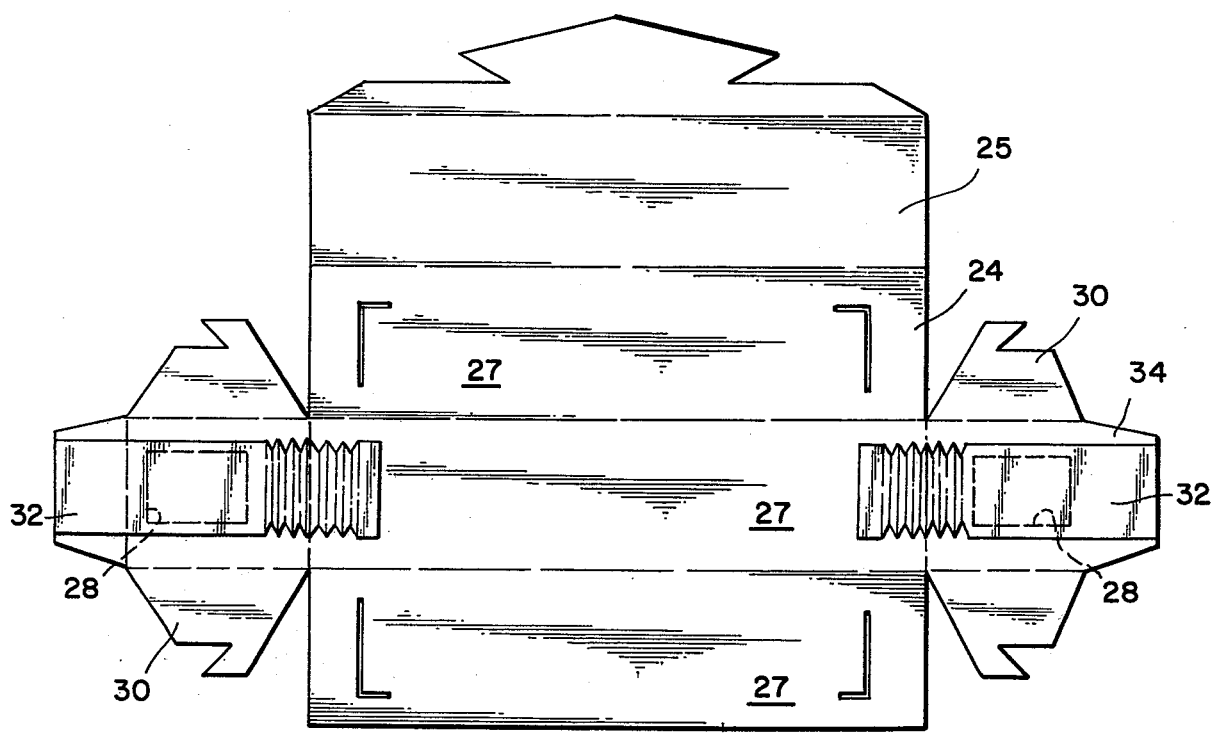
FIG. 13 is a blank similar to FIG. 12 where the end foils are pleated to preclude tearing when form fit to the subject foodstuff.

Aluminum foil electrodes 22 are suitably attached to the inside surfaces of the end panels 16 of the container 10 as shown in FIGS. 12 and 13, draping the plastic film 38 and apertures 36 and extending out of the container 10 by means of the shown end flaps 18.

An electrically high conducting foodstuff such as a frankfurter 24 as shown in FIG. 3 is disposed within an electrically low conducting food substance such as a bun 28. The ends 30 and 32 of the frankfurter are coated with the gel and ionized species composition 26 and is then positioned within the food cavity 12 of the container 10. Plunging means are subsequently applied to the outside surface of the plastic film 38 through the end apertures 36 urging the inside surface of the electrical contacts 22 into an intimate form fitting contact with the ends 30 and 32 of the frankfurter 24 through the medium of the gel and ionized species 26. This construction assures that no edge of any electrical contact 22 touches the frankfurter 24 and precludes burning of the food. The lid 20 is then closed with the flaps 18 and electrical contacts 22 set outside the food cavity. A source of electrical energy 34 as shown in FIG. 7 then contacts the electrical terminals 22 producing a current therethrough sufficient to cook the foodstuff. Electricity is then shut off and the cooked food removed for consumption.

Figure 8:
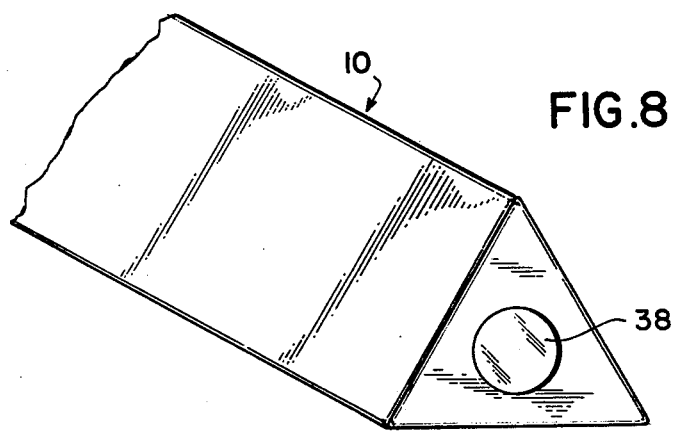
FIG. 8 is an alternate construction of the container disclosed in this application showing a triangular configuration.
Figure 9:
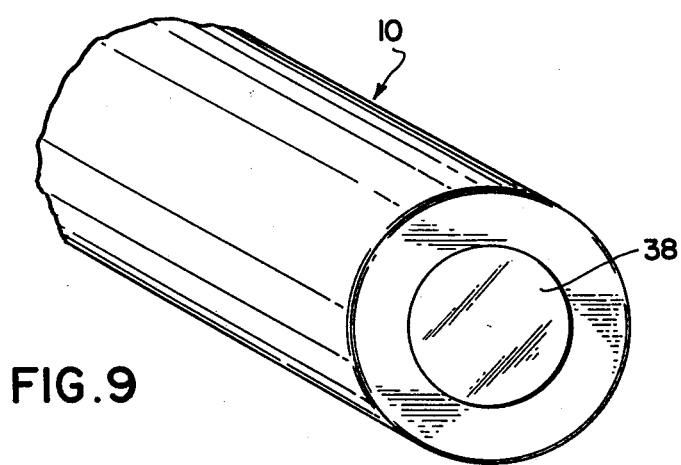
FIG. 9 is an alternate construction of the container disclosed in this application showing a cylindrical configuration.

FIGS. 8 and 9 illustrate alternate triangular and cylindrical configurations for the disclosed container. Other shapes are also possible and do not vary from the intent of the invention.

Figure 10:
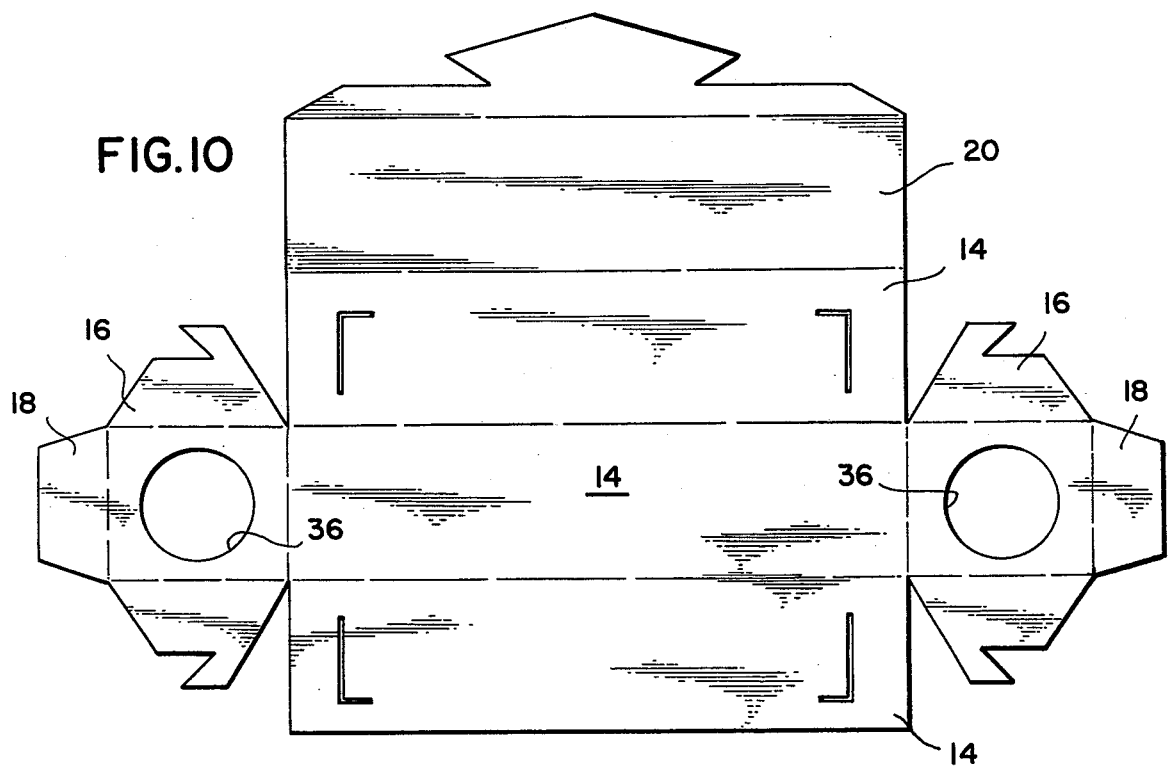
FIG. 10 is a blank similar to FIG. 6 except the end panel apertures are circular.
Figure 11:
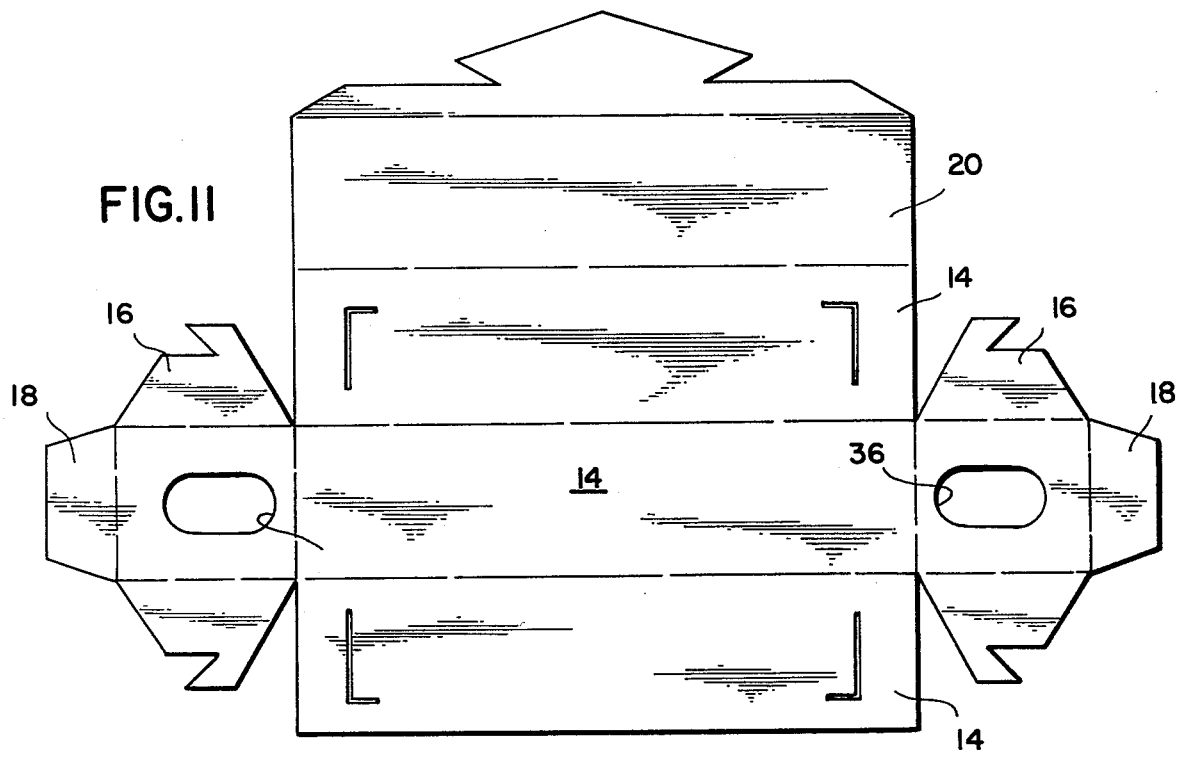
FIG. 11 is a blank similar to FIG. 6 except the end panel apertures are oval.

FIGS. 10 and 11 show alternate circular and oval configurations of end panel apertures 36.

FIG. 12 indicates a blank which when erected forms the container 10 of this disclosure. Here shown attached to the end panels 16 are the foil electrodes 22 which drape apertures 36 and extend out of the container upon flaps 18.

FIG. 13 shows an alternate arrangement for the foil electrodes 22 wherein the foils are appropriately pleated thus providing added insurance against foil tearing during the application of the aforementioned plunging means.

It is understood that the presently disclosed embodiment is revealed for the purposes of illustration only and is not intended to limit the scope of the invention. Changes or modifications of materials or configuration are possible by those skilled in the art without varying from the intent or spirit of this invention.

The following examples A–J serve to illustrate a product taught by Furgal, et al in U.S. Pat. No. 3,062,663. The food products of our invention are compared in subsequent examples with the Furgal, et al products.

EXAMPLES A–J

Figure 14:
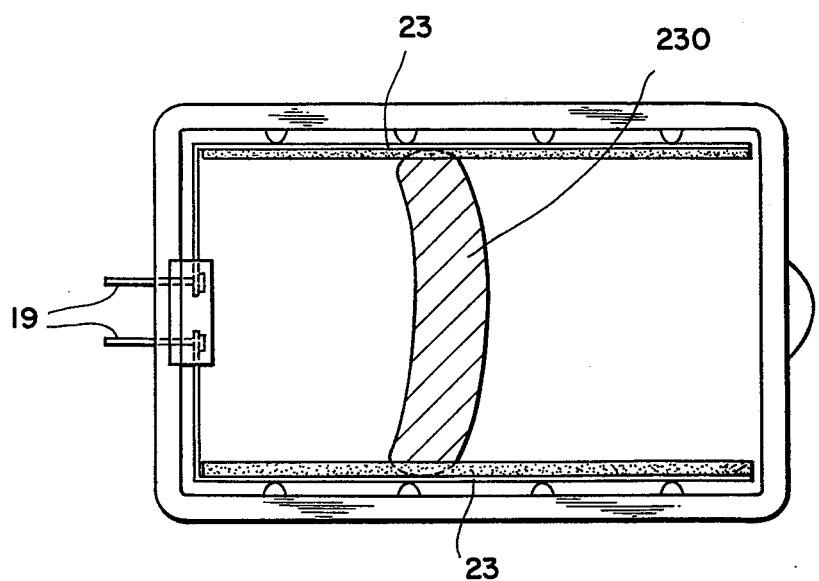
FIG. 14 is an illustration of a package designed similar to that of Furgal, et al in U.S. Pat. No. 3,062,663 issued Nov. 6, 1962.
Figure 15:
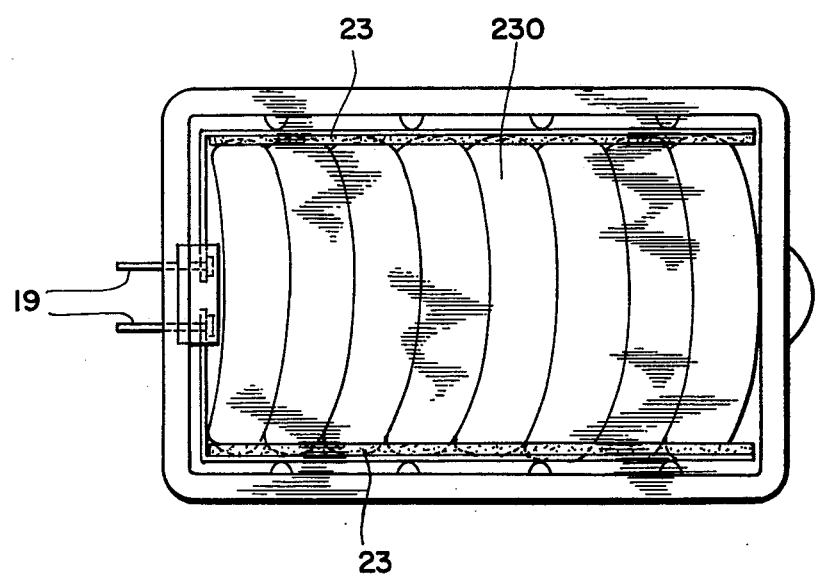
FIG. 15 is a duplicate illustration of the actual Furgal, et al FIG. 2 of U.S. Pat. No. 3,062,663 issued Nov. 6, 1962.

A food package containing one frankfurter illustrated in FIG. 14 is constructed. This package is designed in a manner similar to that of Furgal, et al in U.S. Pat No. 3,062,663 issued on Nov. 6, 1962. This package is different from the actual Furgal, et al FIG. 2 which is illustrated herein as FIG. 15. Foam section 23 was fabricated by slicing a 1½ inches × ½ inch × 10 inches section of "Thrifty Miss ®Wax Applier and Polisher" distributed by Thrifty Miss Products of Linden, N.J. 07036 placing two foam strips whereat reference numeral 23 is set forth in each of the drawings above. Then the following experiments yielding the following results were performed:

EXPERIMENT A

The 1½ inches × ½ inch × 10 inches strips of foam were dipped in a 5% solution of sodium chloride and wrung dry and immediately placed in the food package as set forth in the Furgal design. A frankfurter (Schickhaus, manufactured by the Van Wagenen & Schickhaus Company, a Division of Swift & Company, Kearny, N.J. 07032) [1⅓ oz. wt.] was placed at a position indicated by reference numeral 230 in the above drawings. Electrodes indicated by reference numeral 19 were then connected to a source of electrical power of approximately 320 volts. No cooking of the frankfurter occurred.

EXPERIMENT B

An experiment similar to Experiment. A was carried out with the exception instead of the 5% sodium chloride solution, a saturated sodium chloride solution was used and the sponge was not squeezed dry but was allowed to remain drenched with the saturated salt solution. When the voltage of approximately 320 volts was applied, the hot dog was cooked to an acceptable and edible extent in 15 seconds.

EXPERIMENT C

An experiment similar to Experiment A was carried out with the exception that the sponges indicated by reference numeral 23 in the above drawings were dipped in a 5% sodium chloride solution and permitted to remain drenched with the 5% sodium chloride solution. Application of 280 volts gave rise to arcing at 20 seconds and the buckling of the frankfurter without cooking it.

EXPERIMNET D

An experiment similar to Experiment C was carried out with the exception that a voltage of 110 volts was applied to electrode strips 19. The frankfurter was cooked to an edible extent in 90 seconds.

EXPERIMENT E

An experiment similar to Experiment D was carried out with the exception that the sponges indicated by reference numeral 23 in the drawings were squeezed out prior to application of the voltage of 110 volts. With application of 110 volts, the frankfurter was still cold and uncooked at 2 minutes. Cooking started at 2½ minutes and the frankfurter was just warm at 3½ minutes. The sponges started burning, giving an "off taste" and an "off odor" to the frankfurter and the surrounding environment. In addition, a hole was burned in the electrode.

EXPERIMENT F

An experiment similar to Experiment E was carried out with the exception that the voltage applied at strips indicated by reference numeral 19 in the above drawings was 320 volts. After 25 seconds arcing occurred at one side of the hot dog and the hot dog remained cold and uncooked with no electrical current passing therethrough.

EXPERIMENT G

An experiment similar to Experiment B was carried out with the exception that the voltage applied at strips indicated by reference numeral 19 was 110 volts. Although the frankfurter appeared to be barely warm at 1¼ minutes it was cold at 5 minutes with no cooking taking place.

EXPERIMENT H

An experiment similar to Experiment G was carried out with the exception that a voltage of 320 volts was applied at strips indicated by reference numeral 19. Arcing and burning occurred after 15 seconds with the current rising to 2–3 amperes after 15 seconds; but the frankfurter was well cooked. The experiment was repeated and no cooking occurred. The experiment was repeated again and severe arcing occurred without cooking.

EXPERIMENT J

An experiment similar to Experiment G was carried out with the exception that after 5 minutes of no cooking a 0.5 cc portion of saturated sodium chloride solution was placed in each sponge at a place immediately adjacent to the frankfurter which we were attempting to cook. Immediately on placing the sodium chloride solution in the sponge adjacent to the frankfurter was strips 19 connected to the 110 volt source of electrical power, cooking occurred for an instant, but this ceased immediately and the frankfurter remained essentially uncooked.

The following Examples serve to further illustrate additional embodiments of our invention concerning the composition of the gel and ionized species as it is now preferred to practice it. It will be understood that these Examples are illustrative and that our invention is to be considered restricted thereto only as indicated in the appended claims.

EXAMPLE I

A 6 inch by ¾ inch beef frankfurter is coated at each end to the extent of one inch with a warm aqueous solution of 2% agar and 4% sodium chloride. After setting of the gel by cooling, the frankfurter is placed in a bun and the combination frankfurter and bun is placed in a container having electrical contacts attached thereto and connected to a source of electrical energy as illustrated in FIG. 7. Over a period of 18 seconds, a primary voltage of 115 volts stepped up to 340 volts is applied to the electrical contacts from the electrical energy source which results in a flow of 1.2 up to 3.4 amperes. (To achieve equivalent results, a primary voltage of 110, 220 or 440 volts may be transformed to an applied voltage in the range of 300–400 volts.) The frankfurter roll and frankfurter resulting from the aforementioned treatment is described as "very hot, steaming and slightly split". No arcing took place during the heating operation.

EXAMPLES II – XXIX

The same procedure as Example I is followed in the following examples set forth in the following table. Varied are the gel ionized species composition and the electrical energy contact time and voltage.

| Example | Gel-Ionized Species Combination | Description of Electrical Energy | Result of Electrical Resistance Cooking |
|---|---|---|---|
| II | 2% agar & 5% sodium chloride | Primary voltage of 115 volts stepped up to 335 volts, applied over a period of 12 seconds/1.5–3.2 amperes. | Very hot, steaming. |
| III | 2% agar & 5% sodium chloride | Primary voltage of 115 volts stepped up to 340 volts, applied over a period of 8 seconds/1.4–3.2 amperes. | Hot, not steaming. |
| IV | 2% agar & 5% sodium chloride | Primary voltage of 115 volts stepped up to 345 volts, applied over a period of 10 seconds/1.4–3.2 amperes. | Hot, just starting to steam. |
| V | 2% agar & 5% sodium chloride Agar allowed to set on frankfurter before cooking. | Primary voltage of 115 volts stepped up to 345 volts, applied over a period of 10 seconds/1.4–3.2 amperes. | Hot, steaming. |
| VI | 4% gelatin & 5% sodium chloride | Primary voltage of 115 volts stepped up to 335 volts, applied over a period of 10 seconds/0.8–2.5 amperes. | Frankfurter just warm; arced at end (9 seconds). |
| VII | 4% gelatin & 5% sodium chloride | Primary voltage of 115 volts stepped up to 335 volts, applied over a period of 10 seconds/0.8–2.2 amperes. | Frankfurter just warm; arced at 7 seconds. |
| VIII | 4% gelatin & 5% sodium chloride (Gelatin allowed to dry on hot dog) | Primary voltage of 115 volts stepped up to 340 volts, applied over a period of 10 seconds/0.8–1.2 amperes. | Slight warming; arced at 5 seconds. |
| IX | Gelatin 8% & sodium chloride 5% | Primary voltage of 115 volts stepped up to 345 volts, applied for a period of 10 seconds/1.0–2.6 amperes. | Frankfurter just warm; arcing at 9 seconds. |
| X | Gelatin 8% & sodium chloride 5% | Primary voltage of 115 volts stepped up to 350 volts, applied for a period of 10 seconds/1.2–2.8 amperes. | Cooked, hot frankfurter, no arcing. |
| XI | Gelatin 8% & sodium chloride 5% | Primary voltage of 115 volts stepped up to 335 volts, applied for a period of 10 seconds/1.0–2.6 amperes. | Frankfurter cooked and hot, no arcing. |
| XII | 2% agar & ½% graphite | Primary voltage of 115 volts stepped up to 335 volts, applied for a period of 10 seconds/1.20 amperes. | No cooking (arced at 3 seconds). |
| XIII | Agar 2% & ½% graphite | Primary voltage of 115 volts stepped up to 340 volts, applied for a period of 10 seconds/0.8–2.2 amperes. | Frankfurter slightly warmed but arced at 7 seconds. |
| XIV | Gelatin 12% & sodium chloride 5% | Primary voltage of 115 volts stepped up to 355 volts, applied for a period of 10 seconds/1.2–2.2 amperes. | Frankfurter hot but arced just at the end of the 10-second period. |
| XV | Gelatin 12% & Sodium Chloride 5% | Primary voltage of 115 volts stepped up to 350 volts, applied over a period of 10 seconds/1.2–2.4 amperes. | Frankfurter just warm, arced at 7½ seconds. |
| XVI | 2% agar, ½% sodium chloride & ½% graphite | Primary voltage of 115 volts stepped up to 335 volts, applied over a period of 10 seconds/1–2.8 amperes. | Frankfurter hot but arced just at the end of the 10-second period. |
| XVII | Agar 2%, sodium chloride ½%, graphite ½% | Primary voltage of 115 volts stepped up to 340 volts, applied over a period of 10 seconds/1.0–3.1 amperes. | Frankfurter hot and cooked and no arcing took place. |
| XVIII | Gelatin 12%, Sodium Chloride 7½% | Primary voltage of 115 volts stepped up to 340 volts, applied over a period of 10 seconds/1.2–2.3 amperes. | Frankfurter warmed but arcing at 6 seconds. |
| XIX | Agar 2% and sodium chloride 5% | Primary voltage of 115 volts stepped up to 345 volts, applied over a period of 10 seconds, 1.4–3.2 amperes. | Frankfurter very hot and steaming. |
| XX | Agar 2%, sodium chloride 5% | Primary voltage of 115 volts stepped up to 345 volts, | Frankfurter very hot and shivelled. |

| Example | Gel-Ionized Species Combination | Description of Electrical Energy | Result of Electrical Resistance Cooking |
|---|---|---|---|
| XXI | Agar 2%, sodium chloride 5% | applied over a period of 12 seconds/1.4–3.4 amperes. Primary voltage of 115 volts stepped up to 340 volts, applied over a period of 12 seconds/1.4–2.8 amperes. | Frankfurter hot and cooked. |
| XXII (Control) | Sodium Chloride 5% | Primary voltage of 115 volts stepped up to 355 volts, applied over a period of 12 seconds/1.4–2.7 amperes. | Arcing at 3 seconds; no cooking. |
| XXIII | Gelatin 2%, sodium chloride 5% | Primary voltage of 115 volts stepped up to 350 volts, applied over a period of 12 seconds/1.2–2.2 amperes. | Frankfurter just warm; arcing at 9 seconds. |
| XXIV | Agar 2%, sodium chloride 5% | Primary voltage of 115 volts stepped up to 355 volts, applied over a period of 10 seconds/1.8–3.3 amperes. | Frankfurter extremely hot. |
| XXV | 2% agar, 5% sodium chloride | Primary voltage of 115 volts stepped up to 355 volts, applied over a period of 10 seconds/1.7–3.1 amperes. | Frankfurter very hot. |
| XXVI (Control) | 5% Sodium Chloride | Primary voltage of 115 volts stepped up to 340 volts, applied over a period of 10 seconds/1.2–2.1 amperes. | Arcing at 4 seconds. |
| XXVII | Agar 2%, sodium chloride 5% | Primary voltage of 115 volts stepped up to 345 volts, applied over a period of 10 seconds/1.8–3.4 amperes. | Frankfurter very hot. |
| XXVIII | 2% Agar, 5% sodium chloride | Primary voltage of 115 volts stepped up to 345 volts, applied over a period of 8 seconds/1.6–3.1 amperes. | Frankfurter hot. |
| XXIX (Control) | 2% Sodium Chloride | Primary voltage of 115 volts stepped up to 350 volts, applied over a period of 8 seconds/0.6–2.8 amperes. | Arcing at 8 seconds, no cooking. |

EXAMPLES XXX – LVI

A 6 inch by ¾ inch all beef frankfurter is coated similarly to Example I and is placed in a frankfurter roll which extends beyond the diametrically opposite ends of said frankfurter. The frankfurter in the roll is placed in a container designed as in FIGS. 1 through 7.

The container is produced from cardboard.

The following table sets forth the electrical energy variables as well as the gel-ionized species composition variables upon which the efficiency of cooking of the packaged foot product of our invention is dependent:

| Example | Gel-Ionized Species Combination | Description of Electrical Energy | Result of Electrical Resistance Cooking |
|---|---|---|---|
| XXX | 5% sodium chloride, 2½% gum tragacanth | Primary voltage of 115 volts stepped up to 340 volts, applied to a period of 10 seconds/1.2–3.1 amperes. | Frankfurter very hot. |
| XXXI | 5% sodium chloride, 2½% gum tragacanth | Primary voltage of 115 volts stepped up to 345 volts, applied over a period of 10 seconds/1.2–3.3 amperes. | Frankfurter very hot. |
| XXXII | 5% sodium chloride; 2½% gum tragacanth (solution allowed to "set" on frankfurter) | Primary voltage of 115 volts stepped up to 360 volts, applied over a period of 10 seconds/1.8–4.0 amperes. | Frankfurter very, very hot. |
| XXXIII | 5% sodium bicarbonate; 2½% gum tragacanth | Primary voltage of 115 volts stepped up to 345 volts, applied for a period of 10 seconds/1.4–2.9 amperes. | Frankfurter cooked but not as hot as in Examples XXX or XXXI. |
| XXXIV | 5% sodium bicarbonate; 2½% gum tragacanth | Primary voltage of 115 volts stepped up to 350 volts, applied for a period of 10 seconds/1.4–3.0 amperes. (Composition allowed to set up on hot dog before cooking) | Frankfurter hot. |
| XXXV | 5% sodium bicar- | Primary voltage of | Frankfurter |

-continued

| Example | Gel-Ionized Species Combination | Description of Electrical Energy | Result of Electrical Resistance Cooking |
|---|---|---|---|
| | bonate; 2½% gum tragacanth | 115 volts stepped up to 350 volts, applied for a period of 10 seconds/1.2–2.5 amperes. (Configuration whereby frankfurter at one end of bun was outside of roll and the other end of bun was within roll). | warm but not hot. |
| XXXVI | 5% sodium chloride, 2½% gum tragacanth | Primary voltage of 115 volts stepped up to 360 volts, applied for 10 seconds/1.8–3.4 amperes. (Composition allowed to set up on frankfurter before commencing cooking). | Frankfurter hot. |
| XXXVII | ½% carboxy methyl cellulose; 5% sodium chloride | Primary voltage of 115 volts stepped up to 365 volts, applied for 10 seconds/1.6–3.6 amperes. | Frankfurter hot. |
| XXXVIII | ½% carboxy methyl cellulose, 5% sodium chloride | Primary voltage of 115 volts stepped up to 350 volts, applied for a period of 10 seconds/1.4–2.6 amperes. | Frankfurter undercooked and warm. |
| XXXIX | ½% carboxy methyl cellulose, 5% sodium chloride | Primary voltage of 115 volts stepped up to 355 volts, applied for a period of 10 seconds/1.5–3.0 amperes. | Frankfurter and bun hot. |
| XL | ½% carboxy methyl cellulose, 5% sodium chloride | Primary voltage of 115 volts stepped up to 360 volts, applied for two 10 second periods/ first period 1.5–3.3 amperes, second period 2.6–3.4 amperes. | Frankfurter and bun very, very hot. |
| XLI | 10% sodium chloride, 2½% gum tragacanth | Primary voltage of 115 volts stepped up to 340 volts, applied for a period of 10 seconds/1.5–3.0 amperes. | Frankfurter and bun hot. |
| XLII | 2½% gum tragacanth, 10% sodium chloride | Primary voltage of 115 volts stepped up to 345 volts, applied for a period of 10 seconds/1.6–3.4 amperes. (Solution set up on frankfurter prior to electrical resistance cooking). | Frankfurter and bun hot. |
| XLIII | 2½% gum tragacanth, 10% sodium chloride | Primary voltage of 115 volts stepped up to 345 volts, applied for a period of 10 seconds/2.0–3.2 amperes. (Entire hot dog coated with composition). | Arcing occurred at 3.2 amps, not servicable. |
| XLIV | 1% xanthan gum, 5% sodium chloride | Primary voltage of 115 volts stepped up to 340 volts, applied for a period of 10 seconds/1.4–2.5 amperes. (Extra long (8 inches) hot dog). | Frankfurter warm. |
| XLV | 1% xanthan gum, 5% sodium chloride | Primary voltage of 115 volts stepped | Frankfurter hot. |

-continued

| Example | Gel-Ionized Species Combination | Description of Electrical Energy | Result of Electrical Resistance Cooking |
|---|---|---|---|
| | | up to 350 volts, applied for two 10 second periods/ first period 1.6–3.2 amperes; second period 3.2–3.8–2.6 amperes. | |
| XLVI | 2½% gum tragacanth, no ionized species | Primary voltage of 115 volts stepped up to 335 volts, applied for a period of 10 seconds/1.4–2.7 amperes. | Frankfurter and bun hot. |
| XLVII | 2½% gum tragacanth, no ionized species | Primary voltage of 115 volts stepped up to 335 volts, applied for a period of 10 seconds/1.4–3.2 amperes. | Frankfurter and bun hot. |
| XLVIII | 2½% gum tragacanth, 1% sodium chloride | Primary voltage of 115 volts stepped up to 340 volts, applied for a period of 10 seconds/1.4–2.9 amperes. | Frankfurter and bun hot. |
| XLIX | 2½% gum tragacanth, 1% sodium chloride | Primary voltage of 115 volts stepped up to 340 volts, applied for two 10 second periods/ first period 1.4–2.8 amperes; second period 3.0–2.8 amperes. | Frankfurter and bun hot. |
| L (Control) | ½% carboxy methyl cellulose, no ionized species | Primary voltage of 115 volts stepped up to 345 volts, applied for a period of 10 seconds/1.4–2.5 amperes. | Frankfurter just warm. |
| LI | ½% carboxy methyl cellulose, no ionized species | Primary voltage of 115 volts stepped up to 340 volts, applied for a period of 10 seconds/104–2.4 amperes. | Arced at end of 10-second period; not servicable. |
| LII | ½% carboxy methyl cellulose, 1% sodium chloride | Primary voltage of 115 volts stepped up to 340 volts; applied for two 10 second periods/ first period 1.4–2.5 amperes, second period 2.5 amperes. | Arcing at end of second period, not servicable. |
| LIII | ½% carboxy methyl cellulose, 3% sodium chloride | Primary voltage of 115 volts stepped up to 350 volts, applied for two 10 second periods/ first period 1.6–2.9 amperes; second period 3.0 amperes. | Arcing at 8 seconds; not servicable. |
| LIV | 2½% gum tragacanth, 10% sodium chloride | Primary voltage of 115 volts stepped up to 355 volts, applied for two 10 second periods/ first period 1.6–3.0 amperes; second period 3.2–3.6 amperes. | Frankfurter and bun very, very hot; no arcing. |
| LV | 2½% gum tragacanth, 10% sodium chloride | Primary voltage of 115 volts stepped up to 340 volts, applied for a period of 10 seconds. | Frankfurter cooked well; hot. |

EXAMPLES LVI – LIX

In the following Examples LVI – LIX a hamburger being coated at opposite ends thereof with a coating comprising 2½% gum tragacanth and 1% sodium chloride (the coating covering 20% of the surface area of the hamburger) weighing 4 ounces is placed in a stan-